United States Patent Office 3,396,220
Patented Aug. 6, 1968

3,396,220
MANUFACTURE OF CERAMIC ARTICLES
George Garside Dewsnap, Southport, Ambrose George, Salford, and Leonard Heathcote, Eccles, England, assignors, by mesne assignments, to Secretary of State for Defence in the Government of the United Kingdom of Great Britain and Northern Ireland
No Drawing. Filed May 25, 1962, Ser. No. 198,688
Claims priority, application Great Britain, May 26, 1961, 19,069/61
2 Claims. (Cl. 264—65)

This invention relates to the manufacture of thin walled ceramic articles including shells and flat plates. The invention is of particular value in the manufacture of ceramic radomes for high speed missiles which radomes are required to transmit radar microwaves and must be capable of withstanding considerable handling and aerodynamic stresses as well as severe aerodynamic heating. Radomes are moreover required to be dense and impervious and a high order of accuracy in respect of shape and wall thickness must be maintained. It is therefore desirable to reduce, as far as possible, shrinkage and distortion during firing of the ware.

It has previously been proposed to manufacture radomes and other thin walled ceramic shells by flame spraying the ceramic onto a rigid form which is then eliminated by solution, oxidation or differential expansion; the shell being, thereafter, fired to increase its strength and density. This method represents a considerable improvement over the earlier methods such as slip casting or dry pressing but has been found to have the disadvantage that distortion and slumping of the unsupported shell are still liable to occur during firing, especially at high temperatures when the ware is in a comparatively plastic state, and it is, moreover, difficult to provide adequate support during firing.

The present invention therefore provides an improved process for the manufacture of thin walled ceramic articles which process includes depositing a coating of ceramic material on the surface of a rigid form capable of elimination by oxidation, firing the coating in a reducing atmosphere with the form in situ and, thereafter, reducing the temperature until the ware is firm enough to stand without support and changing the atmosphere to an oxidising one for elimination of the form.

In this process, sintering of the ware and elimination of the form are accomplished by a single firing operation and the ware is supported by the form during sintering thus reducing the possibility of distortion and hence permitting the use of higher sintering temperatures. Furthermore shrinkage is reduced since the ware cannot shrink to less than the size of the form. Any attempt at further shrinkage will be accompanied by stretch forming and/or creeping of the ware up the form. Stretch forming can occur without cracking since the material is sufficiently plastic at sintering temperature. Stretch forming would, of course, be accompanied by a reduction in wall thickness and creep by a reduction in overall dimension but in either case this reduction can be allowed for by making the pre-sintered article slightly oversize.

The reduction in temperature before burning out the form should be such as will allow the article to become firm enough to stand without support but not enough to allow sufficient differential shrinkage to cause cracking. It has been found that a reduction of the order of 10% is normally suitable.

The rigid form should be of a refractory and easily oxidisable material and should have a coefficient of thermal expansion not greater than that of the ceramic article. This last requirement might possibly be modified by the use of high heating rates when the coating would be heated more rapidly than the form. The most useful material for the form is carbonaceous material and, in particular, graphite.

The ceramic material may be any of a very wide range of materials though silica may present some difficulty since its coefficient of expansion is less than that of carbon. The ceramic coating may be deposited on the form by such methods as hydrostatic pressing but, where considerable dimensional accuracy is essential in the finished product, as in the manufacture of radomes it is preferred to flame spray the ceramic. For radome manufacture it is found that alumina is a very suitable material and is obtainable in very pure form, 98% alumina, suitable for flame spraying.

As an example of the process, a radome of 7½ inches outside diameter and 16 inches high with a thickness of ¼ inch, was made by flame spraying high purity alumina onto a graphite form and firing, with the form in situ, in a reducing atmosphere at 1700° C. The temperature was then reduced to 1550° C. and 6% oxygen introduced into the furnace atmosphere after which the ware was soaked for 24 hours before cooling. The ware showed a shrinkage of only 1% to 1½% and an ovality of .004 inch on the 7½ inch diameter. The well thickness was within ±.001 inch of nominal. This was sufficiently accurate not to require machining after firing.

This shrinkage of 1 to 1½% compares with 3 to 4% when the form is eliminated prior to sintering and the order of 20% when using the slip casting method.

Where great accuracy in wall thickness is required, such as the ½% tolerance for some radomes, it may be desirable to include a further step of machining the article before firing since machining at this stage of manufacture is easier than after sintering. A form is first machined to the required internal shape on a copying machine. The tool is then replaced by a spray gun on the same machine and the form is sprayed with ceramic to rather more than the required thickness. The tool is then replaced and the ceramic machined to the required external contour, due allowance being made for shrinkage on subsequent firing, the form having remained in the machine during the whole process. Thus the wall thickness is accurate within the limits of the machine. Preferably the same machine tool or grinding head and the same copy plate are used for both machining operations the diameter of the stylus being changed to provide the difference between inside and outside forms. The form is then removed from the machine and fired as previously described.

We claim:
1. A process for the manufacture of thin-walled ceramic radomes comprising, flame spraying a graphite form with alumina of at least 98% purity, firing on the form the alumina shell to prevent excessive shrinkage in a reducing atmosphere at approximately 1700° C., reducing the temperature to approximately 1550° C. to permit the shell to harden sufficiently to be self-sustaining, burning the form out completely by introducing aprpoximately six percent oxygen while continuing the heating at the reduced temperature whereby the supported shell is sintered and the form removed in a single firing operation to produce a finished radome having a shrinkage from the desired dimensions not in excess of 1½%.

2. A process for the manufacture of thin walled ceramic radomes for minimum shrinkage which comprises the steps of machining a graphite form to the required contour on a copying machine, replacing the tool on the same machine with a spray gun, spraying alumina of at least 98% purity from said gun onto the machined form to produce a coating with a thickness slightly more than required, machining the ceramic coating with the same machine to dimensions slightly larger than those of the required external contour so that later shrinkage below the desired contour dimensions will be held to a minimum, firing on the form the alumina shell in a reducing atmosphere at 1700° C., reducing the temperature to approximately 1550° C. to permit the shell to harden sufficiently to be self-sustaining, burning the graphite form out completely by introducing six percent oxygen while continuing the heating at the reduced temperature to produce an unsupported shell in a single firing operation having a shrinkage below the desired dimensions not in excess of one-half percent.

References Cited

UNITED STATES PATENTS

| | | |
|---|---|---|
| 2,339,003 | 1/1944 | Boer. |
| 2,974,388 | 3/1961 | Ault. |
| 2,227,308 | 12/1940 | Hildabolt. |

SAMUEL W. ENGLE, *Primary Examiner.*